(12) United States Patent
Huang et al.

(10) Patent No.: US 12,286,520 B2
(45) Date of Patent: Apr. 29, 2025

(54) FLAME RETARDANT MASTERBATCH COMPOSITION FOR FOAMS CONTAINING A PH MODERATOR

(71) Applicant: DDP Specialty Electronic Materials US, LLC, Wilmington, DE (US)

(72) Inventors: Wenyi Huang, Midland, MI (US); Shari Kram, Sanford, MI (US); Mark Rickard, Midland, MI (US); Ravi B Shankar, Midland, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 0 days.

(21) Appl. No.: 18/435,138

(22) Filed: Feb. 7, 2024

(65) Prior Publication Data

US 2024/0174828 A1    May 30, 2024

Related U.S. Application Data

(62) Division of application No. 17/516,016, filed on Nov. 1, 2021, now Pat. No. 11,939,445.

(60) Provisional application No. 63/119,883, filed on Dec. 1, 2020.

(51) Int. Cl.
| | | |
|---|---|---|
| *C08J 3/22* | (2006.01) | |
| *C08J 3/20* | (2006.01) | |
| *C08J 9/00* | (2006.01) | |
| *C08J 9/12* | (2006.01) | |
| *C08J 9/14* | (2006.01) | |
| *C08L 25/06* | (2006.01) | |

(52) U.S. Cl.
CPC ............ *C08J 9/0061* (2013.01); *C08J 3/201* (2013.01); *C08J 3/226* (2013.01); *C08J 9/0095* (2013.01); *C08J 9/122* (2013.01); *C08J 9/125* (2013.01); *C08J 9/146* (2013.01); *C08L 25/06* (2013.01); *C08J 2201/03* (2013.01); *C08J 2203/06* (2013.01); *C08J 2203/10* (2013.01); *C08J 2203/142* (2013.01); *C08J 2363/04* (2013.01); *C08J 2425/06* (2013.01); *C08L 2201/02* (2013.01); *C08L 2203/14* (2013.01)

(58) Field of Classification Search
CPC . C08J 9/0061; C08J 3/201; C08J 3/226; C08J 9/0095; C08J 9/122; C08J 9/125; C08J 9/146; C08J 2201/03; C08J 2203/06; C08J 2203/10; C08J 2203/142; C08J 2363/04; C08J 2425/06; C08J 2453/02; C08J 2463/00; C08J 2491/00; C08J 9/0038; C08J 9/0066; C08J 2325/06; C08J 9/0023; C08J 9/009; C08L 25/06; C08L 2201/02; C08L 2203/14; C08L 53/025

See application file for complete search history.

(56) References Cited

U.S. PATENT DOCUMENTS

| | | | |
|---|---|---|---|
| 7,851,558 B2 | 12/2010 | King et al. | |
| 9,517,579 B2 | 12/2016 | Kram et al. | |
| 9,663,649 B2 | 5/2017 | Kram et al. | |
| 2010/0331433 A1 | 12/2010 | Annan et al. | |
| 2014/0187692 A1* | 7/2014 | Stobby | C08K 5/52 525/359.1 |
| 2014/0303285 A1* | 10/2014 | Hou | C08L 101/16 523/451 |

FOREIGN PATENT DOCUMENTS

| | | |
|---|---|---|
| EP | 2990419 A1 | 3/2016 |
| JP | 2015101702 A * | 6/2015 |
| JP | WO2014174704 A1 | 2/2017 |
| WO | 2012/082332 A1 | 6/2012 |
| WO | 2014066089 A1 | 5/2014 |

OTHER PUBLICATIONS

Halasa et al., "High Vinyl High Styrene Solution SBR", Polymer, vol. 46, p. 4166 (2005).
Halasa et al., "Metalation of Unsaturated Polymers by Using Activated Organolithium Compounds and the Formation of Graft Copolymers", Journal of Polymer Sciences: Polymer Chemistry Edition; vol. 14, 497-506 (1976).
PCT International Search Report, mailed Feb. 23, 2022, for international application No. PCT/US2021/057564, filed Nov. 1, 2021; ISA/EPO; Authorized Officer Wibke, Meiser.

* cited by examiner

*Primary Examiner* — K. Boyle

(57) ABSTRACT

A masterbatch composition suitable for use as a flame retardant in extruded polymer foams, and process for manufacturing the same, and extruded foams containing same; the composition comprising: (a) 20 to 40 parts by weight base resin comprising styrene homopolymer or copolymer; (b) 1 to 16 parts by weight acid scavenger comprising an epoxy-based compound; (c) 2 to 6 parts by weight antioxidant comprising an alkyl or aryl phosphite; and (d) 45 to 60 parts by weight flame retardant comprising a non-hexabromocyclododecane (HBCD) brominated polymer or copolymer, wherein the amounts of (a), (b), (c), and (d) total 100 parts by weight; and (e) 0.6 to 10 parts by weight of pH moderator, based on 100 parts of (a) base resin plus (e) water soluble pH moderator.

6 Claims, 1 Drawing Sheet

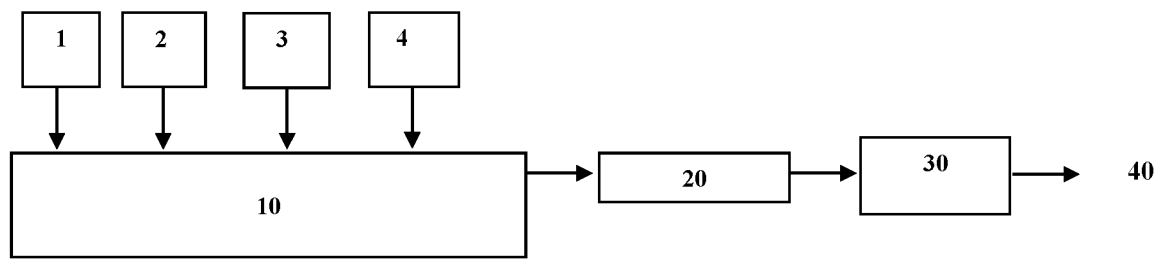

FLAME RETARDANT MASTERBATCH COMPOSITION FOR FOAMS CONTAINING A PH MODERATOR

BACKGROUND OF THE INVENTION

Field of the Invention. The present invention relates to stabilized environmentally-friendly masterbatch compositions that contain a brominated polymeric flame retardant, specifically masterbatch compositions that are suitable for use in solid foams as an additive composition.

Description of Related Art. Various environmentally-friendly brominated organic-based polymeric flame retardants (FR) compounds, such as those disclosed in Kram, et al., U.S. Pat. No. 9,663,649, can be used to impart flame retardancy to solid foams, and flame retardants can be incorporated into the foam using a masterbatch composition. However, the ultimate flame retardancy performance of the brominated compounds in such foams can depend on the thermal stability of the bromine-carbon bonds. That is, these bonds must be stable enough to endure the temperatures encountered during the various manufacturing processes that may be used in formulating the masterbatch composition initially, or in combining the masterbatch composition into a separate resin or foam composition, or further in the actual making of an article comprising the resin or foam composition containing the masterbatch composition. It is desirable for the brominated FR additive composition to not be appreciably negatively affected by these manufacturing steps, which can include exposure to temperatures in excess of 200° C. This helps ensure the brominated FR additive composition performs as intended, that is, it retains adequate bromine that can be released as an active bromine-containing species to help suppress flames under fire conditions if the final article containing the masterbatch composition experiences a thermal event (e.g., to 250° C. or a higher temperature).

Generally, masterbatch composition manufacturing processes, or processes that combine the masterbatch composition into a resin or foam composition, are melt processes and occur in an organic phase. If the brominated FR additive is not adequately thermally stable, bromine can become liberated during these processes. This bromine can form the acid hydrogen bromide (HBr) that can corrode processing equipment, further catalytically degrade the FR additive, and present concerns about worker exposure. To mitigate this acid formation, organically soluble acid scavengers, such as epoxy-based acid scavengers, are added to the brominated FR additive masterbatch composition to manage this acid in the organic phase.

However, in many final foam formulations, including formulations comprising styrene-acrylonitrile (SAN) copolymers, water is used as a co-blowing agent. The mobility of the HBr is high in the aqueous phase and the HBr can drive undesirable kinetics of dehydrohalogenation reactions, including undesirable viscosity increases via cross linking of the SAN copolymers also known as SAN hydrolysis.

What is needed is a water soluble pH moderator that can be included in the brominated FR additive masterbatch composition, that can survive the melt processes of manufacturing the masterbatch composition and further processing of the masterbatch composition into a resin or foam composition, and that can further be available as a pH moderator when water is present, particularly when water is used as a co-blowing agent to make a foam. In particular, what is needed is a water soluble pH moderator that will not negatively impact the foam-forming process or the appearance of the resulting foam as evidenced by the Yellow Index; and that further slows the induction time for kinetics of side chemistries in that foam composition, as evidenced by the degradation onset time of the foam or masterbatch by thermogravimetric analysis (TGA).

BRIEF SUMMARY OF THE INVENTION

The present invention relates to a masterbatch composition suitable for use as a flame retardant in extruded polymer foams, comprising:
(a) 20 to 40 parts by weight base resin comprising styrene homopolymer or copolymer;
(b) 1 to 16 parts by weight acid scavenger comprising an epoxy-based compound;
(c) 2 to 6 parts by weight antioxidant comprising an alkyl or aryl phosphite; and
(d) 45 to 60 parts by weight flame retardant comprising a non-hexabromocyclododecane(HBCD) brominated polymer or copolymer;
wherein the amounts of (a), (b), (c), and (d) total 100 parts by weight;
the masterbatch composition further comprising
(e) 0.6 to 10 parts by weight of water soluble pH moderator, based on 100 parts of base resin plus the at least one water soluble pH moderator.

The present invention also relates to an extruded polymer foam comprising a masterbatch composition, the masterbatch composition comprising:
(a) 20 to 40 parts by weight base resin comprising styrene homopolymer or copolymer;
(b) 1 to 16 parts by weight acid scavenger comprising an epoxy-based compound;
(c) 2 to 6 parts by weight antioxidant comprising an alkyl or aryl phosphite; and
(d) 45 to 60 parts by weight flame retardant comprising a non-hexabromocyclododecane(HBCD) brominated polymer or copolymer;
wherein the amounts of (a), (b), (c), and (d) total 100 parts by weight;
the masterbatch composition further comprising
(e) 0.6 to 10 parts by weight of a water soluble pH moderator, based on 100 parts of (a) base resin plus (e) water soluble pH moderator.

The present invention further relates to a process for manufacturing a masterbatch composition suitable for use as a flame retardant in extruded polymer foams, comprising the steps of:
a) providing a base resin to a mixing device operating at temperature of 150 to 230° C. to form a molten base resin;
b) contacting the molten base resin in the mixing device with:
  i) acid scavenger comprising one or more epoxy-based compounds;
  ii) antioxidant comprising an alkyl or aryl phosphite;
  iii) water soluble pH moderator; and
  iv) flame retardant comprising a non-hexabromocyclododecane(HBCD) brominated polymer or copolymer
  to form a molten flame retardant masterbatch composition; and
c) cooling the molten flame retardant masterbatch composition to form a solid flame retardant masterbatch composition.

BRIEF DESCRIPTION OF THE DRAWINGS

FIG. 1 is an illustration of one possible process for making pellets of a masterbatch composition using a twin-screw extrusion line.

DETAILED DESCRIPTION OF THE INVENTION

The present invention relates to a more environmental-friendly masterbatch composition suitable for use as a flame retardant in extruded polymer foams, the masterbatch comprising (a) base resin comprising styrene homopolymer or copolymer; (b) acid scavenger comprising an epoxy-based compound; (c) antioxidant comprising an alkyl or aryl phosphite; (d) flame retardant comprising non-hexabromocyclododecane(HBCD) brominated polymer or copolymer and (e) water soluble pH moderator.

By "masterbatch composition", it is meant that the composition can be used as an additive in resins and foams.

By "flame retardant" it is meant that an ingredient has the ability to increase the Limiting Oxygen Index (LOI) values of melt-fabricated articles, such as foams, fibers, films, etc., thereby enabling such articles to pass standard fire tests. Air contains approximately 21% oxygen and therefore any material with a LOI value of 21 or less will likely burn in air. Specifically, for the purposes herein, an ingredient is considered a flame retardant if its presence in a composition or formulation can increase the LOI of the article to 24 or greater. A Limiting Oxygen Index of 24 or greater enables many foam articles to pass standard fire tests, such as Underwriters Laboratory (UL) 723 and European Norm (EN) Fire Test #ISO 11925-2 Class E, and North American building code standards for C578 and S701.

(a) Base Resin

The masterbatch composition comprises base resin that is used primarily as a carrier resin for compounding the flame retardant with the other additives. The base resin comprising styrene homopolymer or copolymer is present in the masterbatch composition in an amount of 20 to 40 parts by weight, based on the total amount in the masterbatch composition of (a) base resin comprising styrene homopolymer or copolymer, (b) acid scavenger comprising an epoxy-based compound; c) antioxidant comprising an alkyl or aryl phosphite; and (d) flame retardant comprising non-hexabromocyclododecane(HBCD) brominated polymer or copolymer.

For the purposes herein, it is understood the "base resin comprising styrene homopolymer or copolymer" as recited herein could be one or more resin(s) comprising styrene homopolymer or copolymer, and the amount of "base resin comprising styrene homopolymer or copolymer" is considered to be the total amount of resin(s) comprising styrene homopolymer or copolymer in the masterbatch composition, separate from any flame retardant polymers comprising styrene homopolymer or copolymer. Also, for the purposes herein regarding the amounts of ingredients in the masterbatch, the base resin(s) comprising styrene homopolymer or copolymer is(are) considered separate from the flame retardant(s) comprising non-hexabromocyclododecane(HBCD) brominated polymer or copolymer.

It is believed that having less than 20 parts by weight of the base resin in the masterbatch composition can raise the viscosity and melt temperature of the masterbatch, particularly above 230° C., which can lead to increased thermal decomposition because of shear heating. Also, the presence of the base resin helps disperse the ingredients into the masterbatch, and if too little base resin is present, the flame retardant may not be adequately dispersed and will instead form large domains of flame retardant in the masterbatch. This in turn can negatively impact the ability of acid scavenger(s), the antioxidant(s), and pH moderator(s) to effectively protect the flame retardant. More than 40 parts by weight of the base resin in the masterbatch composition is undesirable because this unnecessarily increases the manufacturing cost of masterbatch. In some embodiments, the base resin comprising styrene homopolymer or copolymer is present in the masterbatch composition in an amount of 26 to 35 parts by weight, based on the total amount of components (a), (b), (c), and (d) described previously.

Some preferred base resins include polystyrene homopolymers, and copolymers of styrene with ethylene, propylene, acrylic acid, maleic anhydride, and/or acrylonitrile. Polystyrene homopolymer is most preferred. Blends of any two or more of the foregoing polymers, or of one or more of the foregoing polymers with another resin, also can be used as the base resin.

In some embodiments, base resins of styrene/butadiene copolymers are especially preferred. Some styrene/butadiene block copolymers that are useful as the starting polymer include those available from Dexco Polymers under the trade designation VECTOR™. Styrene/butadiene random copolymers may be prepared in accordance with the processes described by A. F. Halasa in Polymer, Volume 46, page 4166 (2005). Styrene/butadiene graft copolymers may be prepared in accordance with methods described by A. F. Halasa in Journal of Polymer Science (Polymer Chemistry Edition), Volume 14, page 497 (1976). Styrene/butadiene random and graft copolymers may also be prepared in accordance with methods described by Hsieh and Quirk in chapter 9 of Anionic Polymerization Principles and Practical Applications, Marcel Dekker, Inc., New York, 1996. A starting polymer may also contain repeating units formed by polymerizing monomers other than butadiene and a vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the vinyl aromatic monomer and/or butadiene, may be polymerized to form blocks, or may be grafted onto the starting butadiene copolymer. The most preferred type of starting butadiene polymer is a block copolymer containing one or more polystyrene blocks and one or more polybutadiene blocks. Among these, di-block and tri-block copolymers are especially preferred.

(b) Acid Scavenger

Acid scavenger(s) comprising an epoxy-based compound is(are) present in the masterbatch composition in an amount of 1 to 16 parts by weight, based on the total amount in the masterbatch composition of (a) base resin comprising styrene homopolymer or copolymer, (b) acid scavenger comprising an epoxy-based compound; c) antioxidant comprising an alkyl or aryl phosphite; and (d) flame retardant(s) comprising non-hexabromocyclododecane(HBCD) brominated polymer or copolymer.

For the purposes herein, it is understood the "acid scavenger comprising an epoxy-based compound" as recited herein could be one or more acid scavenger(s) comprising an epoxy-based compound, and the amount of "acid scavenger comprising an epoxy-based compound" is considered to be the total amount of acid scavenger(s) comprising an epoxy-based compound in the masterbatch composition.

It is believed that less than 1 part by weight acid scavenger in the masterbatch composition will not provide adequate acid scavenging performance for the masterbatch, and the more than 20 parts by weight acid scavenger in the masterbatch composition is undesirable not only because higher amounts do not provide appreciable benefit commensurate with the increased cost, but also higher amounts can cause masterbatch pellets to stick together. In some embodiments, the acid scavenger is present in the masterbatch composition in an amount of 4-10 parts by weight, based on the total amount of components (a), (b), (c), and (d) described previously.

Further, from 3 to 11 parts by weight of the acid scavenger are present per 100 parts by weight of the flame retardant in the masterbatch composition. In some embodiments, 4 to 7 parts by weight of the acid scavenger are present per 100 parts by weight of the flame retardant in the masterbatch composition. In some embodiments, 8 to 10 parts by weight of the acid scavenger are present per 100 parts by weight of the flame retardant in the masterbatch composition.

In some embodiments, the epoxy compound contains on average at least one and preferably two or more epoxide groups per molecule. The epoxy compound preferably has an equivalent weight per epoxide group of no more than 2000, preferably no more than 1000 and even more preferably no more than 500. The molecular weight of the epoxy compound is at least 1000 in some preferred embodiments. The epoxy compound can further be brominated. A variety of commercially available epoxy resins are suitable. These may be based, for example, on a bisphenol compound, such as various diglycidyl ethers of bisphenol A. They may be based on a brominated bisphenol compound. The epoxy compound may be an epoxy novolac resin, or an epoxy cresol novolac resin. The epoxy compound may be an entirely aliphatic material, such as a diglycidyl ether of a polyether diol or an epoxidized vegetable oil. Examples of commercially available epoxy compounds that are useful herein include F2200HM and F2001 (from ICL Industrial Products), DEN 439 (from The Dow Chemical Company), Araldite ECN-1273 and ECN-1280 (from Huntsman Advanced Materials Americas, Inc.), and Plaschek 775 (from Valtris Specialty Chemicals).

In some preferred embodiments, the acid scavenger comprises an epoxy cresol novolac resin. In some other preferred embodiments, the acid scavenger comprises epoxidized oil. In some other preferred embodiments, epoxy cresol novolac resin and epoxidized oil are both present in the masterbatch composition as acid scavengers. In some other preferred embodiments, the acid scavenger in the composition comprises a majority of epoxidized oil; that is, more than 50 weight percent of the epoxy compound present in the masterbatch composition is in the form of epoxidized oil.

(c) Antioxidant

The masterbatch composition includes at least one antioxidant for stabilizing radicals formed during manufacture of the masterbatch composition and later incorporation of the masterbatch composition in a subsequent foam composition. These undesirable radicals can lead to undesirable color formation and crosslinking that can foul foaming process equipment, requiring downtime for cleaning.

The antioxidant comprising an alkyl or aryl phosphite is present in the masterbatch composition in an amount of 2 to 6 parts by weight, based on the total amount in the masterbatch composition of (a) base resin comprising styrene homopolymer or copolymer, (b) acid scavenger comprising an epoxy-based compound; (c) antioxidant comprising an alkyl or aryl phosphite; and (d) flame retardant comprising non-hexabromocyclododecane(HBCD) brominated polymer or copolymer.

For the purposes herein, it is understood the "antioxidant comprising an alkyl or aryl phosphite" as recited herein could be one or more antioxidant(s) comprising an alkyl or aryl phosphite, and the amount of "antioxidant comprising an alkyl or aryl phosphite" is considered to be the total amount of antioxidant(s) comprising an alkyl or aryl phosphite in the masterbatch composition.

It is believed that less than 2 parts by weight antioxidant in the masterbatch composition will not provide adequate inhibition of undesirable oxidation reactions, and that more than 6 parts by weight antioxidant in the masterbatch composition is undesirable because this adds cost without appreciable benefit. In some embodiments, the antioxidant comprising an alkyl or aryl phosphite is present in the masterbatch composition in an amount of 3-4.5 parts by weight, based on the total amount of components (a), (b), (c), and (d) described previously.

Suitable alkyl phosphites are described in U.S. Pat. No. 9,663,649 to Kram et al. Specific examples of preferred alkyl phosphites include bis (2,4-dicumylphenyl)pentaerythritol diphosphite, distearylpentaerythritol diphosphite and di (2,4-di-(t-butyl)phenyl) pentaerythritol diphosphite. These are commercially available as Doverphos™ S-9228 (Dover Chemical Corporation), Doverphos™ S-682 (Dover Chemical Corporation) and Irgafos™126 (Ciba Specialty Chemicals).

Suitable aryl phosphites are described in PCT Publication No. WO2014/174704 to Huang et al. Specific examples of some preferred aryl phosphites include substituted aryl phosphites. One specific such preferred aryl phosphite is tris(2,4-di-tert-butylphenyl)phosphite, commercially available under the name Irgafos™ 168. If desired, a mixture of both alkyl and aryl phosphites can be used together in the masterbatch.

Further, from 3 to 11 parts by weight of the antioxidant are present per 100 parts by weight of the flame retardant in the masterbatch composition. In some embodiments, 4 to 7 parts by weight of the antioxidant are present per 100 parts by weight of the flame retardant in the masterbatch composition. In some embodiments, 8 to 10 parts by weight of the antioxidant are present per 100 parts by weight of the flame retardant in the masterbatch composition.

(d) Flame Retardant

The flame retardants used in the masterbatch composition are non-hexabromocyclododecane(HBCD) brominated polymers and copolymers. These are considered more environmental responsible replacements for HBCD, a commonly used flame retardant for polystyrene foams that has experienced governmental regulatory issues due to bioaccumulation concerns.

In some embodiments, preferred flame retardants used in the masterbatch composition are thermally stable brominated copolymers such as a brominated styrene/butadiene block copolymer (Br-SBC), brominated random styrene/butadiene copolymer (Br-r-SB), or brominated styrene/butadiene graft copolymer (Br-g-SB) such as disclosed in U.S. Pat. No. 7,851,558 to King et al.

In some embodiments, a preferred non-HBCD brominated polymer or copolymer flame retardant has the following structure and is commercially available from the DuPont Company, Inc under that name BLUEDGE™ polymeric flame retardant (PFR) and is also available as Emerald Innovation™ 3000 and FR122P.

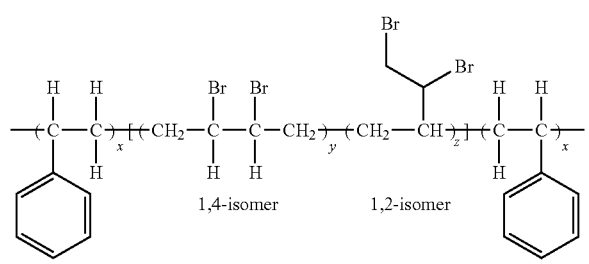

Some other suitable non-HBCD brominated polymer or copolymer flame retardants are disclosed in "Flame Retardant Alternatives For Hexabromocyclododecane (HBCD)—Final Report" (June 2014) by the United States Environmental Protection Agency. One class of non-HBCD brominated flame retardants mentioned in the report was TBBPA-bis brominated ether derivatives, such as those having the chemical name of (1,1'-(1-methylethylidene)bis [3,5-dibromo-4-(2,3-dibromo-2-methylpropoxy)] benzene) that is commercially available under the names of PYROGUARD SR-130 and SR-130. Another class of non-HBCD brominated flame retardants mentioned in the report was TBBPA bis(2,3-dibromopropyl) ethers, such as those having the chemical name of (:1,1'-(1-methylethylidene)bis[3,5-dibromo-4-(2,3-dibromopropoxy)] benzene) commercially available under the names of PYROGUARD SR 720 and SR 720. While each of the non-HBCD brominated flame retardants can be used by themselves in the masterbatch, in some instances it may be desirable to have a mixture of these non-HBCD brominated flame retardants in the masterbatch.

In some embodiments, the flame retardant used in the masterbatch composition comprises brominated styrene/butadiene block copolymer in which fewer than 1% of the carbon-bromine bonds are at allylic or tertiary carbons. Further, in a preferred embodiment, the amount of flame retardant used in the masterbatch composition should be sufficient to provide an extruded polymer foam composition, to which the masterbatch has been added, 0.35 to 5 weight percent bromine. In some embodiments, the amount of flame retardant used in the masterbatch composition should be sufficient to provide an extruded polymer foam composition 1.0 to 2.5 weight percent bromine.

Further, while the total amount of masterbatch added to a foam composition can vary over a wide range, depending on such things as the type of foam, the desired foam application, and the inclusion of other additives, it is desirable in many instances that the masterbatch be present in the final foam in an amount that ranges from about 0.5 to about 7.6 weight percent, based on the total combined weight of the foam plus the masterbatch. In some embodiments, the masterbatch is present in the final foam in amounts of about 0.6 to 4 weight percent, based on the total combined weight of the foam plus the masterbatch; while in other embodiments, the masterbatch is present in the final foam in amounts from about 3 to 7.6 weight percent based on the total combined weight of the foam plus the masterbatch.

The non-HBCD brominated polymer or copolymer flame retardant is present in the masterbatch composition in an amount of 45 to 60 parts by weight, based on the total amount in the masterbatch composition of (a) base resin comprising styrene homopolymer or copolymer, (b) acid scavenger comprising an epoxy-based compound; c) antioxidant comprising an alkyl or aryl phosphite; and (d) flame retardant comprising non-hexabromocyclododecane (HBCD) brominated polymer or copolymer.

For the purposes herein, it is understood the "flame retardant comprising non-hexabromocyclododecane (HBCD) brominated polymer or copolymer" as recited herein could be one or more flame retardant(s) comprising non-hexabromocyclododecane(HBCD) brominated polymer or copolymer, and the amount of "flame retardant comprising non-hexabromocyclododecane(HBCD) brominated polymer or copolymer" is considered to be the total amount of flame retardant(s) comprising non-hexabromocyclododecane(HBCD) brominated polymer or copolymer in the masterbatch composition. Also, for the purposes herein regarding the amounts of ingredients in the masterbatch, the flame retardant(s) comprising non-hexabromocyclododecane (HBCD) brominated polymer or copolymer is(are) considered separate from the base resin(s) comprising styrene homopolymer or copolymer.

Approximately 45 parts by weight of the non-HBCD brominated polymer or copolymer flame retardant in the masterbatch composition is considered a practical minimum for a desirable masterbatch composition suitable for use in many applications. It is believed that less than this amount may still provide some flame retardancy, but not at the level required by many FR standards, meaning additional flame retardants will have to be separately added to the final foam composition to meet those standards, essentially defeating the value of having a single flame retardant masterbatch composition. Further, more than 60 parts by weight of the non-HBCD brominated polymer or copolymer flame retardant in the masterbatch composition is undesirable. Such masterbatches, having a high concentration of flame retardant, are not only susceptible to thermal decomposition from shear heating, but also have a higher viscosity making them more difficult to disperse in foam formulations. The 45 to 60 parts by weight of the non-HBCD brominated polymer or copolymer flame retardant in the masterbatch provides a bromine loading of approximately 29 to 40% bromine to the masterbatch. In some embodiments, the non-HBCD brominated polymer or copolymer flame retardant is present in the masterbatch composition in an amount of 50 to 55 parts by weight, based on the total amount of components (a,), (b), (c), and (d) in the masterbatch described previously.

(e) Water Soluble pH moderator

The masterbatch composition further comprises 0.6 to 10 parts by weight of water soluble pH moderator, based on 100 parts of (a) base resin plus (e) water soluble pH moderator. In some embodiments, the masterbatch has a minimum of 1 part by weight water soluble pH moderator and a maximum of 10 parts by weight water soluble pH moderator, based on 100 parts of (a) base resin plus (e) water soluble pH moderator. In some other embodiments, the masterbatch has a minimum of 1.5 parts by weight water soluble pH moderator and a maximum of 10 parts by weight water soluble pH moderator, based on 100 parts of (a) base resin plus (e) water soluble pH moderator.

For the purposes herein, it is understood the "water soluble pH moderator" as recited herein could be one or more water soluble pH moderator(s), and the amount of "water soluble pH moderator" is considered to be the total amount of water soluble pH moderator(s) in the masterbatch composition.

It is believed that less than 0.6 parts by weight water soluble pH moderator will not provide adequate stabilizing performance for the masterbatch, and that more than 10 parts by weight water soluble pH moderator is undesirable because higher quantities can build up on dies and affect foam quality. In some embodiments, the masterbatch composition comprises 5 to 10 parts by weight of a water soluble pH moderator, and in some embodiments 6 to 10 parts by weight of a water soluble pH moderator, again based on 100 parts of (a) base resin plus (e) water soluble pH moderator. In some other embodiments, the masterbatch composition comprises 1.5 to 5 parts by weight of a water soluble pH moderator, again based on 100 parts of (a) base resin plus (e) water soluble pH moderator.

By "water soluble" it is meant that the pH moderator has a solubility in room temperature (20° C., 68° F.) water of at least 20 grams per liter. Preferably, the water soluble pH moderator has a solubility in room temperature (20° C., 68° F.) water of at least 90 grams per liter. This level of solubility ensures the pH moderator will be adequately available when contacted with an acidic species in an aqueous phase in the foam making process.

Further, in some embodiments, the preferred water soluble pH moderators are those that do no form undesirable byproducts in the masterbatch or foam after reacting with free hydrogen bromide. In some most preferred embodiments, the water soluble pH moderators are compounds that react with hydrogen bromide and essentially form only salts as byproducts. For example, sodium carbonate reacts with HBr to form sodium bromide and sodium bicarbonate. Likewise, sodium bicarbonate reacts with HBr to form sodium bromide, carbon dioxide, and water. In some other embodiments, suitable water soluble pH moderators are compounds that react with hydrogen bromide and essentially form only salts or weak acids as byproducts. For example, sodium borates such as sodium tetraborate decahydrate form sodium bromide and very weak boric acids.

In some embodiments, the water soluble pH moderator is sodium carbonate, sodium bicarbonate, or a borate such as sodium tetraborate decahydrate. In some preferred embodiments, the water soluble pH moderator is sodium carbonate, commonly known as soda ash. The use of soda ash has several unexpected benefits. First, while soda ash is a weak base, it has found that it has sufficient alkalinity and reaction kinetics to effectively neutralize the strong acid HBr that is generated by the degradation of the carbon-bromide bond from the backbone of the brominated flame retardants.

Second, the soda ash can be well dispersed in the polymer and does not have a major negative effect on foaming processes in which the masterbatch composition is used. No process issues such as die buildup, or surface defects on the resultant foams were observed.

Third, the soda ash is highly soluble in water and ultimately generates by-products of $H_2O$ and $CO_2$ which are common to many foam processes as blowing agents so the soda ash is a gentle volatile additive in the process.

Finally, it was unexpectantly found that the addition of soda ash allowed a reduction in the amount of higher-cost organic epoxide acid scavengers needed in the composition, as evidenced by similar TGA degradation onset times for the masterbatch and foam when a portion of the acid scavenger was replaced by the pH moderator.

While the epoxy-based acid scavengers are organic and can manage acidic species in the organic phase, the addition of a water soluble pH moderator can help maintain the pH in the aqueous phase, where the mobility of an acidic species like HBr is high and can rapidly drive the kinetics of dehydrohalogenation reactions. In particular, the use of soda ash significantly impacts the induction time for kinetics of side chemistries which can lead to undesirable viscosity increases via cross linking in formulations comprising styrene-acrylonitrile (SAN) copolymers.

Further, it is unexpected that suitable foams can be made with a flame retardant masterbatch comprising 0.6 to 10 parts by weight water soluble pH moderator, based on 100 parts of (a) base resin plus (e) water soluble pH moderator, particularly since the stabilizer is an inorganic material. The conventional wisdom is that inorganic materials, even if used in even minor amounts, can form deposits on processing surfaces and slough off, creating defects in the masterbatch or foam. Further, these undesirable deposits have an extended heat history that can reduce the thermal stability of the masterbatch and foam. Therefore, one would not expect that any of the suitable amounts of water soluble pH moderator discussed herein would be able to provide the perfectly suitable foams that have been made.

Process for Making Masterbatch Composition

The present invention further relates to a process for manufacturing a masterbatch composition suitable for use as a flame retardant in extruded polymer foams, comprising the steps of:

a) providing a base resin to a mixing device operating at temperature of 150 to 230° C. to form a molten base resin;

b) contacting the molten base resin in the mixing device with:
   i) acid scavenger comprising one or more epoxy-based compounds;
   ii) antioxidant comprising an alkyl or aryl phosphite;
   iii) water soluble pH moderator; and
   iv) flame retardant comprising a non-hexabromocyclododecane(HBCD) brominated polymer or copolymer
   to form a molten flame retardant masterbatch composition; and c) cooling the molten flame retardant masterbatch composition to form a solid flame retardant masterbatch composition.

In some embodiments, the process for manufacturing a masterbatch composition suitable for use as a flame retardant in extruded polymer foams can further include the step of:

d) pelletizing the solid flame retardant masterbatch composition to form pellets.

The process for manufacturing a masterbatch composition suitable for use as a flame retardant in extruded polymer foams comprises combining and mixing together a number of ingredients, including base resin, flame retardant, antioxidant, acid scavenger, and water soluble pH moderator at a temperature suitable for making a molten mixture of the masterbatch, and then cooling that molten composition to form a solid. The solid is then optionally formed into pellets.

The mixing can be achieved in any device that can provide (or maintain) the ingredients with (at) a suitable elevated temperature such that the base resin and organic additives melt, and all the ingredients are suitably uniformly dispersed in the melt phase. Generally, it is advantageous to melt a quantity of the base resin as a carrier and then add the other ingredients, either singly or in mixtures. As such, typically extruders, specifically twin-screw extruders and variants that use a screw-type or other mixing elements such as a Farrel continuous mixer are preferred, as continuous production of the masterbatch is possible. However, the mixing can be conducted in a batch mode using any type of mixture capable of operating at an elevated temperature.

In a preferred process, a base resin as previously described herein is provided in pellet or powder form to a mixing device, such as a twin-screw extruder, operating at a temperature of about 150 to 230° C., which forms a molten base resin. The base resin, and any of the other ingredients that are in pellet or powder form, can be metered into the extruder using weigh feeders or hoppers designed to supply the extruder, or other even devices such as feeder extruders. Ingredients in liquid form can be supplied to the extruder using either metering pumps or various pumping and metering devices.

The molten base resin in the mixing device is then contacted with at least one acid scavenger comprising one or more epoxy-based compounds, at least one antioxidant and at least one water soluble pH moderator.

In some preferred processes, the acid scavenger is an epoxidized oil or an epoxy cresol novolac resin. In some especially preferred processes the molten base resin is contacted with both an epoxidized oil and an epoxy cresol novolac resin. This can be accomplished sequentially by separate additions, as the oil is a liquid and the resin can be in pellet or powder form. In some embodiments where the epoxidized oil is used, it is preferably the majority of the acid scavenger used in the process, as the oil provides some additional lubricating quality to the extrusion process.

The antioxidant and the water soluble pH moderator are generally added to the composition in small quantities, while the flame retardant generally forms the majority component in the masterbatch. While each of these ingredients can be added separately to the mixing device, but it can be advantageous to first mix the solid (powder and/or pellet) ingredients together and then add this mixture to the mixing device.

The antioxidant comprises an alkyl or aryl phosphite as previously described herein. The water soluble pH moderator is as previously described herein and is preferably soda ash, added in an amount that is 0.6 to 10 parts by weight of a water soluble pH moderator, based on 100 parts of base resin plus pH moderator.

After suitable mixing to form a uniform molten masterbatch composition, the molten flame retardant masterbatch composition is cooled to form a solid masterbatch composition. If the mixer is an extruder, generally the molten masterbatch composition is extruded through a die into strands of molten material that are cooled into solid strands. The solid masterbatch can in turn be optionally made into masterbatch pellets. One suitable method of cooling the molten flame retardant masterbatch composition is by extruding the composition through a die, followed by quenching the strands via the use of one or more water baths; the quenched strands can be further directed to a pelletizer such as an underwater pelletizer if masterbatch pellets are desired. Preferably the pellets are sized such that there are 25 to 40 pellets per gram.

One possible manufacturing process for the flame retardant masterbatch composition is shown in FIG. 1. A twin-screw extruder 10 maintained at elevated temperature is provided with polystyrene pellets via a feeder 1. As generally a small amount of solid epoxy cresol novolac resin is typically used, a mixture of polystyrene and epoxy cresol novolac resin pellets or powders can be formed and introduced into the extruder via a feeder 2. In this process, a liquid epoxidized oil is next metered into the extruder via an injector 3. Finally, in this process a mixture of the flame retardant, antioxidant, and water soluble pH moderator are added via a side feeder 4.

The twin-screw extruder the extrudes the molten flame retardant masterbatch composition through a die into strands, which are quenched in water bath 20; the quenched strands are then directed to pelletizer 30 to form masterbatch pellets 40.

As illustrated by FIG. 1, in one process for manufacturing the masterbatch composition, preferably at least one of the at least one acid scavenger, the at least one antioxidant, or the water soluble pH moderator contacts the molten base resin in the mixing device prior to the flame retardant contacting the base resin. In an especially preferred process for manufacturing the masterbatch composition, at least one acid scavenger contacts the molten base resin in the mixing device prior to the flame retardant contacting the base resin. This provides a base resin that has pre-loaded protective ingredients that help prevent thermal degradation of the flame retardant during the entire time it is at an elevated temperature.

Further, as previously discussed herein, preferably the process for manufacturing the masterbatch composition comprises providing (a) 20 to 40 parts by weight of at least one base resin comprising styrene homopolymer or copolymer to a mixing device operating at temperature of 150 to 230° C. to form a molten base resin, followed by contacting the base resin with (b) 1 to 16 parts by of at least one weight acid scavenger comprising an epoxy-based compound, (c) 2 to 6 parts by weight of at least one antioxidant comprising an alkyl or aryl phosphite; and (d) flame retardant comprising a non-hexabromocyclododecane (HBCD) brominated polymer or copolymer; wherein the amounts of (a), (b), (c), and (d) total 100 parts by weight; the masterbatch composition further comprising (e) 0.6 to 10 parts by weight of a water soluble pH moderator, based on 100 parts of (a) at least one base resin plus (e) water soluble pH moderator.

Extruded Foams

The present invention further relates to extruded polymer foams comprising a masterbatch composition suitable for use as a flame retardant in extruded polymer foams, the masterbatch comprising (a) base resin comprising styrene homopolymer or copolymer; (b) acid scavenger comprising an epoxy-based compound; (c) antioxidant comprising an alkyl or aryl phosphite; (d) flame retardant comprising non-hexabromocyclododecane(HBCD) brominated polymer or copolymer and (e) water soluble pH moderator.

Extruded foams can be made using many different processes, including those such as disclosed in Kram et al., U.S. Pat. No. 9,517,579. The flame retardant masterbatch composition is especially useful in the manufacture of foam boards such as those made in large quantities from styrenic polymers in a melt extrusion process. Such extrusion foaming processes are performed by forming a pressurized melt that contains the polymer(s) to be foamed, which collectively are referred to herein as the bulk polymer, the masterbatch composition suitable for use as a flame retardant as described herein, and a blowing agent; and other additives such as may be useful. One advantage, however, of the use of the present masterbatch is that preferably only the bulk polymer, masterbatch, and blowing agent are required.

The bulk polymer and the masterbatch are conveniently provided to the foam processing apparatus in the form of pellets or other small particulates, which are melted in the foam processing apparatus. The masterbatch may be pre-blended or added simultaneously with the bulk polymer to the foam processing apparatus, in which case the bulk polymer and the masterbatch are concurrently melted in the foam processing apparatus. Alternatively, the masterbatch can be added to foam processing apparatus after the bulk polymer, in which case the bulk polymer is either partially or fully molten. The foam processing apparatus should be of suitable capacity and the rate of processing should be adequate to fully melt and disperse the flame retardant masterbatch uniformly in the bulk polymer.

It is generally preferred to introduce the blowing agent as a separate stream after the polymeric materials have been melted. The blowing agent in an extrusion foaming process can be an exothermic (chemical) type or an endothermic (physical) type. Physical blowing agents such as carbon dioxide, various hydrocarbons, hydrofluorocarbons, water, alcohols, ethers and hydrochlorofluorocarbons are especially suitable.

While the present flame retardant masterbatch having a water soluble pH moderator is especially useful when water is used as at least one of the blowing agents, the water soluble pH moderator is also effective when water is not the blowing agent, as many of the ingredients are not totally free of moisture and most processing equipment is not inerted to prevent water from being absorbed by the materials during the extrusion foaming process.

In one embodiment, the blowing agent is a mixture, and that mixture can include carbon dioxide, ethanol and water. In another embodiment, the blowing agent can include carbon dioxide, ethanol, a $C_4$-$C_5$ hydrocarbon, and water. The $C_4$-$C_5$ hydrocarbon is preferably isobutane. Preferably, total amount of blowing agent is employed in an amount sufficient to provide the extruded foam with a foam density of no greater than 40 kg/m$^3$, more preferably no greater than 36 kg/m$^3$ and still more preferably no greater than 35 kg/m$^3$. It is believed these densities are best achieved when the total amount of blowing agent is within the range of from about 1.1 to about 1.8 moles of blowing agent per kilogram of the bulk polymer. In some instances, a preferred total amount of blowing agent is from 1.1 to about 1.7 moles per kilogram of the bulk polymer. A still more preferred amount is from 1.15 to 1.65 moles per kilogram of the bulk polymer. Individually, carbon dioxide is preferably used in an amount from about 0.5 to about 1.2 moles per kilogram of the bulk polymer, more preferably from 0.65 to about 0.9 moles per kilogram of the bulk polymer. Ethanol is preferably used in an amount of from 0.15 to 0.5 moles per kilogram of the bulk polymer, more preferably from 0.25 to 0.45 moles per kilogram of the bulk polymer. Water is preferably used in an amount of from about 0.1 to about 0.4 moles per kilogram of the bulk polymer, more preferably from 0.1 to 0.3 moles per kilogram of the bulk polymer. The $C_4$-$C_5$ hydrocarbon is preferably present in an amount of up to 0.35 moles per kilogram of the bulk polymer, and more preferably from 0.1 to 0.3 moles per kilogram of the bulk polymer.

In one embodiment, the blowing agent contains a combination, per kilogram of the bulk polymer, of 0.65 to 0.9 moles carbon dioxide, 0.25 to 0.45 moles ethanol and from 0.1 to 0.3 moles water, with the total amount of blowing agent being from 1.1 to 1.65 moles per kilogram of the bulk polymer. In another embodiment the blowing agent combination contains, per kilogram of the bulk polymer, 0.65 to 0.9 moles carbon dioxide, 0.25 to 0.45 moles ethanol, 0.1 to 0.3 moles of isobutene, and from 0.1 to 0.3 moles of water, with the total amount of blowing agent being from 1.15 to 1.65 moles per kilogram of the bulk polymer.

Once the bulk polymer, masterbatch, and other optional additives have been mixed and the polymers melted and further mixed with the blowing agent(s), the resulting gel is forced through an opening into a zone of lower pressure, where the blowing agent expands and the polymer solidifies to form an extruded foam.

Foams produced in this manner preferably have a density of up to 80 kg/m$^3$, more preferably up to 64 kg/m$^3$, and even more up to 48 kg/m$^3$. Foam used as thermal insulation is preferably in the form of boardstock having a density of from 24 to 48 kg/m$^3$. Billet foam preferably has a density of from 24 to 64 kg/m$^3$, more preferably from 28 to 48 kg/m$^3$.

The foams preferably have an average cell size in the range of from 0.1 mm to 4.0 mm, especially from 0.1 to 0.8 mm, as determined per ASTM D3576. The foam may be predominantly closed-celled, i.e., may contain 30% or less, preferably 10% or less and even more preferably 5% or less of open cells, as determined per ASTM D6226-05. More open-celled foams can also be produced in accordance with the invention. Boardstock foams made in accordance with the invention are useful as building foam insulation, as part of roof or wall assemblies. Other foams made in accordance with the invention can be used as decorative billet, pipe insulation and in molded concrete foundation applications.

Test Methods

Degradation Onset Time of Brominated Polymeric Concentrate by Thermogravimetric Analysis (TGA). TGA is a method of thermal analysis in which changes in physical and chemical properties of materials are measured as a function of increasing temperature (with constant heating rate), or as a function of time (with constant temperature and/or constant mass loss). TGA is commonly used to determine selected characteristics of materials that exhibit either mass loss or gain due to decomposition, oxidation, or loss of volatiles (such as moisture). After the sample is loaded, it holds isothermal at 25° C. for 5 minutes under nitrogen, and ramps at 25° C./min to 235° C. It keeps isothermal at 235° C. for 60 minutes and then cools down to 30° C. The TGA onset time is defined as the time when significant degradation begins (inflection point).

Yellow Index (YI) Measurement. Yellow index (YI) is measured according to ASTM E315-15. The samples is measured by a spectrophotometer or tri-stimulus (filter) colorimeter. Values of X, Y.Z for each measurement are measured, and if multiple measurements are made of a single specimen and set of conditions, average values of X, Y, Z are provided. For pellets, YI should be less than 75; for plaques, YI should be less than 40.

The glass transition temperature (Tg) Onset Temperature. Samples with a mass of 5 to 10 mg were cut from a pellet, weighed, and sealed in aluminum DSC pans for analysis. The samples were scanned using a TA Instruments Q2000 DSC (Differential Scanning calorimeter) with an auto-sampler, and a nitrogen purge rate of 50 ml/min. The heating rate was 10° C./min and the temperature profile between 20° C., 200° C., and back to 20° C. was applied twice for each sample. The scans were analyzed using Universal Analysis V4.7A software. The glass transition temperature (Tg) onset temperature was determined as the inflection point of the baseline step transition, reported in degrees Celsius.

Reference Example

This example illustrates some of the benefits of sodium carbonates and sodium borates as pH moderators as an additive in a flame retardant masterbatch suitable for use in foams. Various amounts of the undesirable hydrogen bromide (HBr) are shown in Table 1, along with the amounts of sodium carbonate($Na_2CO_3$), sodium bicarbonate($NaHCO_3$), and tetrasodium pyrophosphate (TSPP) needed to moderate the HBr. As shown, TSPP is a less desirable moderator as significantly more mass is needed to deal with the HBr than for sodium carbonate($Na_2CO_3$) or sodium bicarbonate ($NaHCO_3$).

TABLE 1

| Amount of HBr | Amount Needed* (ppm) | | |
|---|---|---|---|
| (ppm) | Na$_2$CO$_3$ | NaHCO$_3$ | TSPP |
| 50 | 33 | 53 | 83 |
| 100 | 66 | 105 | 166 |
| 200 | 133 | 210 | 333 |

*Assuming reaction is completed without hydrolysis

Further, as shown in Table 2, sodium carbonates and sodium borates are much more desirable moderators in that the byproducts of reaction with the HBr present a lesser threat than reaction with TSPP. This can be seen by the pKa values shown below for each, illustrating the preference for sodium carbonate. Further, while both sodium tetraborate decahydrate have similar pka values, TSPP is not desirable because the counter acids formed upon reaction of the sodium with bromide become successively more aggressive as each sodium ion is removed from the molecule, resulting in undesirable pyrophosphoric acid. Sodium borates are more preferred, even with their lower solubility, because they form very mild acidic species in comparison.

TABLE 2

| pH Moderator | Solubility* (g/L) | Acid Dissociation Constant | | | Byproducts |
|---|---|---|---|---|---|
| | | pKa1 | pKa2 | pKa3 | |
| Sodium Carbonate | 217 | 6.0-8.0 | <3.6 | N/A* | NaBR + NaHCO$_3$ |
| Sodium tetraborate decahydrate | 20 | 9.2 | 12.7 | 13.8 | NaBR + Boric Acids |
| Tetrasodium pyrophosphate | 67 | 9.3 | 6.7 | 2.1 | Disodium Pyrophosphate + Pyrophosphoric Acid |

*in water (20° C., 68° F.)

Example 1

The following components were used to make a masterbatch composition. The base resin was a polystryrene resin in pellet form having a density of 1.04 g/cm$^3$ from PolyOne. The flame retardant was BLUEDGE™ polymeric flame retardant FR63 in powder form having a density of 1.9 g/cm$^3$ from the DuPont Co. The acid scavengers were cresol novolak epoxy resin CNE 220 in pellet form from Chang Chun Chemical Corporation, and Plas-Chek 775 Epoxidized Soybean Oil (ESO) in liquid form from Valtris Specialty Chemicals. The antioxidant was Irgafos 168 in powder form from BASF, and the soda ash from Univar in powder form.

A masterbatch composition was made in the following manner on a 25 mm twin-screw extrusion system having one side feeder, as illustrated in FIG. 1. Specifically, the extruder had 9 barrels with a screw diameter of 25 mm and a length-to-diameter ratio of the screw, L/D=36/1. The extruder temperatures were set to 180° C. and the die temperature was set at 200° C.

A LiW brand loss-in-weight pellet feeder was used to feed pellets of low molecular weight polystyrene base resin to the main feed throat, followed by a second LiW brand loss-in-weight pellet feeder that fed a mixture of the same low molecular weight polystyrene base resin pellets with cresol novolak epoxy pellets. Preheated epoxidized soybean oil (ESO) was then fed and injected into the extruder by using two 1000D Teledyne ISCO syringe pumps. The flame retardant, soda ash, and antioxidant were pre-mixed and then fed into the side feeder, slowly introducing the powders to the extruder until the feed rate reached the target value. The compounded polymer melt then passed through a strand die and was quenched in a water trough. The polymer strands were dried by an air blade and then pelletized by a pelletizer, which produced pellets of the masterbatch composition.

The total feed rate was 160 g/min and the screw speed was maintained at 170 rpm for all items; other processing conditions are summarized in Table 3. There was an ESO leakage issue for Items 5, 10 and 12 that prevented the formation of good masterbatches for testing. The masterbatch compositions that were made and the resultant data from testing those compositions are given in Table 4, including the important properties of TGA onset time, and Yellow index. The data illustrates that the addition of the inexpensive soda ash allows the amount of the much more expensive epoxy compounds to be reduced and still make a masterbatch having improved or equivalent properties.

TABLE 3

| Item | Temperature at Barrel #9 (° C.) | Die Pressure (psi) |
|---|---|---|
| 1 | 188 | 182 |
| 2 | 192 | 266 |
| 3 | 191 | 352 |
| 4 | 190 | 283 |
| 5 | — | — |
| 6 | 191 | 290 |
| 7 | 188 | 189 |
| 8 | 191 | 184 |
| 9 | 190 | 381 |
| 10 | — | — |
| 11 | 189 | 153 |
| 12 | — | — |
| 13 | 193 | 490 |
| 14 | 195 | 179 |

TABLE 4

| Item | Base Resin (wt %) | CNE220 (wt %) | ESO (wt %) | FR63 (wt %) | Soda Ash (wt %) | Irgafos 168 (wt %) | TGA onset time (min) | Tg-2nd Heating (° C.) | Yellow Index |
|---|---|---|---|---|---|---|---|---|---|
| 1 | 31.1 | 3.25 | 6.75 | 53.8 | 1 | 4.1 | 23.26 | 62.87 | 25.63 |
| 2 | 31.1 | 4.5 | 4.5 | 53.8 | 2 | 4.1 | 19.79 | 62.35 | 23.99 |
| 3 | 29.1 | 2 | 9 | 53.8 | 2 | 4.1 | 20.02 | 63.26 | 26.37 |
| 4 | 33.6 | 2 | 4.5 | 53.8 | 2 | 4.1 | 19.76 | 62.27 | 26.73 |
| 5 | 26.6 | 4.5 | 9 | 53.8 | 2 | 4.1 | NA | NA | NA |
| 6 | 31.1 | 0 | 9 | 53.8 | 2 | 4.1 | 23.79 | 57.79 | 22.97 |
| 7 | 31.1 | 3.25 | 6.75 | 53.8 | 1 | 4.1 | 22.16 | 62.56 | 24.17 |
| 8 | 31.1 | 3.25 | 6.75 | 53.8 | 1 | 4.1 | 19.96 | 62.42 | 26.59 |

TABLE 4-continued

| Item | Base Resin (wt %) | CNE220 (wt %) | ESO (wt %) | FR63 (wt %) | Soda Ash (wt %) | Irgafos 168 (wt %) | TGA onset time (min) | Tg-2nd Heating (° C.) | Yellow Index |
|---|---|---|---|---|---|---|---|---|---|
| 9 | 28.6 | 4.5 | 9 | 53.8 | 0 | 4.1 | NA | NA | NA |
| 10 | 33.1 | 4.5 | 4.5 | 53.8 | 0 | 4.1 | 22.21 | 68.09 | 26.52 |
| 11 | 33.1 | 2 | 9 | 53.8 | 0 | 4.1 | NA | NA | NA |
| 12 | 35.6 | 2 | 4.5 | 53.8 | 0 | 4.1 | 22.7 | 65.45 | 28.4 |
| 13 | 34.5 | 4.5 | 4.5 | 53.8 | 0 | 2.7 | 20.8 | 66.2 | 28.33 |
| 14 | 31.1 | 3.25 | 6.75 | 53.8 | 1 | 4.1 | 22.53 | 58.83 | 25.79 |

NA—Not available

Example 2

Example 1 is repeated, however, one quarter of the amount of BLUEDGE™ flame retardant is replaced with an equivalent amount by weight PYROGUARD SR 720 flame retardant. The results obtained are similar to those in Table 4.

Example 3

Polystyrene copolymer was fed into an extruder at a temperature of approximately 200° C. and combined with a previously made masterbatch to form a molten polystyrene copolymer/masterbatch mixture to be made into foams. The masterbatch was made as in Example 1 by combining a polystyrene resin base resin, a solid acid scavenger, a liquid acid scavenger, an antioxidant, and 1.5 weight percent soda ash, along with the same amount of the BLUEDGE™ polymeric flame retardant FR63 powder (53.8 wt %). The amount of masterbatch used in the polystyrene copolymer/masterbatch mixture was adequate to achieve a bromine loading in the final foam of 0.35 weight percent. Very minor amounts of additives (e.g., talc, screw lubricant additive) were also added to the extruder to aid processing.

Extruded foams were then made from the molten polystyrene copolymer/masterbatch mixture to confirm the composition was suitable for making foams that would pass the fire retardancy and other requirements of the North American Building Code Standards for C578 and S701, including Underwriters Laboratory (UL) 723. To confirm the performance of the foams, the molten polystyrene copolymer/masterbatch mixture was combined with various mixtures of blowing agents (hydrofluorocarbon, $CO_2$, and water) to form a series of foamable mixtures. Each foamable mixture was cooled and extruded through a slit die into atmospheric pressure to form a series of foam boards. The resulting foam boards had good skin quality, were free of blowholes, and had foam densities ranging from 1.5 to 2.53 pounds per cubic foot. The thicknesses of the foam boards varied between 1 and 2.12 inches as shown in Table 5. All of the foams further had a nominal bromine content of 0.35 weight percent and had an L.O.I in excess of 24.

Table 6 further summarizes the foam properties relatable to the codes and standards, including Vertical Cell Size (VCS), Vertical Compressive Strength (Vc), Extrusion Compressive Strength (Ec), Horizontal Compressive Strength (Hc), and Vc divided by the total of all three (Vc/Vc+Ec+Hc) which provides indication of balance of the cell orientation. The foams further had an open cell content of less than 5 percent and a calculated thermal insulating performance of greater than R5 per inch.

The resulting foams, therefore, fully met the fire retardancy and other requirements of the North American Building Code Standards for C578 and S701, including Underwriters Laboratory (UL) 723.

TABLE 5

| Item | Thickness (inches) | Density (lb/ft³) |
|---|---|---|
| 1 | 2.10 | 2.53 |
| 2 | 1.03 | 2.52 |
| 3 | 1.03 | 1.60 |
| 4 | 1.03 | 1.59 |
| 5 | 1.04 | 2.45 |
| 6 | 2.12 | 2.49 |
| 7 | 2.02 | 2.09 |

TABLE 6

| Item | VCS (mm) | Vc (psi) | Ec (psi) | Hc (psi) | Vc/(Vc + Ec + Hc) |
|---|---|---|---|---|---|
| 1 | 0.21 | 65.2 | 36.7 | 44.0 | 0.45 |
| 2 | 0.16 | 43.9 | 59.6 | 38.8 | 0.31 |
| 3 | 0.17 | 16.2 | 36.3 | 12.4 | 0.25 |
| 4 | 0.17 | 16.5 | 35.0 | 11.8 | 0.26 |
| 5 | 0.19 | 44.3 | 55.0 | 39.0 | 0.32 |
| 6 | 0.25 | 66.0 | 36.1 | 41.4 | 0.46 |
| 7 | 0.17 | 45.2 | 32.9 | 27.7 | 0.43 |

What is claimed is:

1. A process for manufacturing a masterbatch composition suitable for use as a flame retardant in extruded polymer foams, comprising the steps of:
   a) providing a base resin to a mixing device operating at temperature of 150 to 230° C. to form a molten base resin;
   b) contacting the molten base resin in the mixing device with:
      i) acid scavenger comprising an epoxy-based compound;
      ii) antioxidant comprising an alkyl or aryl phosphite;
      iii) water soluble pH moderator; and
      iv) flame retardant comprising a non-hexabromocyclododecane (HBCD) polymer or copolymer
   to form a molten flame retardant masterbatch composition; and
   c) cooling the molten flame retardant masterbatch composition to form a solid flame retardant masterbatch composition,
   wherein the masterbatch composition has
      (A) 20 to 40 parts by weight of the base resin comprising styrene homopolymer or copolymer;

(B) 1 to 16 parts by weight of the acid scavenger comprising an epoxy-based compound;
(C) 2 to 6 parts by weight of the antioxidant comprising an alkyl or aryl phosphite; and
(D) 45 to 60 parts by weight of the flame retardant comprising a non-hexabromocyclododecane (HBCD) brominated polymer or copolymer;
wherein the amounts of (A), (B), (C), and (D) total 100 parts by weight; and
(E) 0.6 to 10 parts by weight of the water soluble pH moderator, based on 100 parts of (A) base resin plus (E) water soluble pH moderator.

2. The process for manufacturing a masterbatch composition of claim 1 further comprising the step of:
d) pelletizing the solid flame retardant masterbatch composition to form pellets.

3. The process for manufacturing a masterbatch composition of claim 1 wherein in step b) the acid scavenger contacting the molten base resin is epoxidized oil, epoxy cresol novolac resin, or a brominated epoxy compound.

4. The process for manufacturing a masterbatch composition of claim 3 wherein in step b) the molten base resin is contacted sequentially with both epoxidized oil and epoxy cresol novolac resin by separate additions.

5. The process for manufacturing a masterbatch composition of claim 1 wherein at least one of the acid scavenger, the antioxidant, or the water soluble pH moderator contacts the molten base resin in the mixing device prior to the flame retardant contacting the base resin.

6. The process for manufacturing a masterbatch composition of claim 5 wherein the acid scavenger contacts the molten base resin in the mixing device prior to the flame retardant contacting the base resin.

* * * * *